United States Patent [19]

Minoura et al.

[11] Patent Number: 5,678,649
[45] Date of Patent: Oct. 21, 1997

[54] STEERING CONSOLE FOR A WORKING VEHICLE

[75] Inventors: Akira Minoura, Duluth, Ga.; Masatake Murakawa, Sakai, Japan

[73] Assignee: Kubota Corporation, Japan

[21] Appl. No.: 313,683

[22] Filed: Sep. 27, 1994

[30] Foreign Application Priority Data

Sep. 28, 1993 [JP] Japan .................. 5-240798
Sep. 30, 1993 [JP] Japan .................. 5-244043
Dec. 9, 1993 [JP] Japan .................. 5-308794

[51] Int. Cl.$^6$ .................................... B60K 11/08
[52] U.S. Cl. .................... 180/68.3; 180/68.1
[58] Field of Search ................ 180/68.1, 68.3, 180/68.4, 69.2, 69.24; 123/41.7, 41.66

[56] References Cited

U.S. PATENT DOCUMENTS

| | | | |
|---|---|---|---|
| 1,925,415 | 10/1933 | Strauss | 180/68.1 |
| 2,891,370 | 6/1959 | Musgrave | 180/68.1 |
| 3,796,277 | 3/1974 | Gordon | 180/68.3 |
| 4,432,309 | 2/1984 | Hutchison et al. | 123/41.66 |
| 4,702,079 | 10/1987 | Saito et al. | 180/68.4 |
| 4,738,327 | 4/1988 | Takei | 180/69.24 |
| 4,940,100 | 7/1990 | Ueda | 180/68.1 |
| 4,996,442 | 2/1991 | Wayne | 180/68.1 |
| 5,193,636 | 3/1993 | Holm | 180/68.1 |
| 5,207,187 | 5/1993 | Kurohara et al. | 180/68.1 |

FOREIGN PATENT DOCUMENTS 4-311666 11/1992 Japan .

*Primary Examiner*—Robert J. Oberleitner
*Assistant Examiner*—Frank Vanaman
*Attorney, Agent, or Firm*—Webb Ziesenheim Bruening Logsdon Orkin & Hanson, P.C.

[57] ABSTRACT

A steering console connected to an engine hood to form an engine accommodating space with the engine hood. The steering console has a right side wall, a left side wall, a front wall interconnecting one vertical edge of the right side wall and one vertical edge of the left side wall, a control panel interconnecting upper edges of the right side wall, left side wall and front wall, and a steering column projecting upward from the control panel. The right side wall, left side wall, front wall and steering column are integrally formed of plastics to constitute the steering console. The front wall defines air flow guides, the side walls define partition plates, and the control panel defines an indicator support flange. These flow guides, partition plates and flange all extend obliquely downward.

5 Claims, 6 Drawing Sheets

STEERING CONSOLE FOR A WORKING VEHICLE

BACKGROUND OF THE INVENTION

1. Field of the Invention

The present invention relates to a steering console for a working vehicle, particularly for a lawn mower or a tractor, the steering console being connected to an engine hood to form an engine accommodating space with the engine hood. This steering console has functions to support a steering stem and form a control panel.

2. Description of the Related Art

A conventional steering console for a working vehicle is disclosed in Japanese Patent Publication Kokai No. 4-311666, for example. This steering console includes side panels, a front panel, air intake netting, a steering column, a display panel and a console frame, all formed of sheet metal or the like. These components are assembled and connected by screws or the like.

The above conventional construction has a large number of components, requiring many assembling steps and inhibiting cost reduction. The large number of components is a disadvantage in terms of lightness also.

SUMMARY OF THE INVENTION

The object of the present invention is to provide a steering console for a working vehicle which has a reduced number of components to realize a simplified construction and contribute toward lightness.

The above object is fulfilled, according to the present invention, by a steering console connected to an engine hood to form an engine accommodating space with the engine hood, the steering console being formed of plastics to be an integral whole and comprising:

a right side wall and a left side wall;

a front wall interconnecting one vertical edge of the right side wall and one vertical edge of the left side wall;

an upper wall interconnecting upper edges of the right side wall, left side wall and front wall, the upper wall acting as a control panel; and a steering column projecting upward from the upper wall for supporting a steering stem;

The steering console according to the present invention has varied components formed of plastics to be integral with one another. This steering console itself requires substantially no assembly work. The integrally formed steering console may be mounted on a vehicle simply by fixing the console to a body frame, and connecting the console to an engine hood. This feature contributes greatly to a reduction in manufacturing cost.

In a preferred mode of implementing the invention, the front wall defines air flow guides, the side walls define air intake partition plates, and the control panel defines an indicator support flange. These flow guides, partition plates and flange all extend in the same direction, preferably obliquely downward. Dies used in injection molding of this steering console may be removed in the direction in which the flow guides, partition plates and flange extend. This simplifies the molding dies.

Other features and advantages of the present invention will be apparent from the following description of an embodiment taken in conjunction with the drawings.

DESCRIPTION OF THE PREFERRED EMBODIMENT

Figure 1:
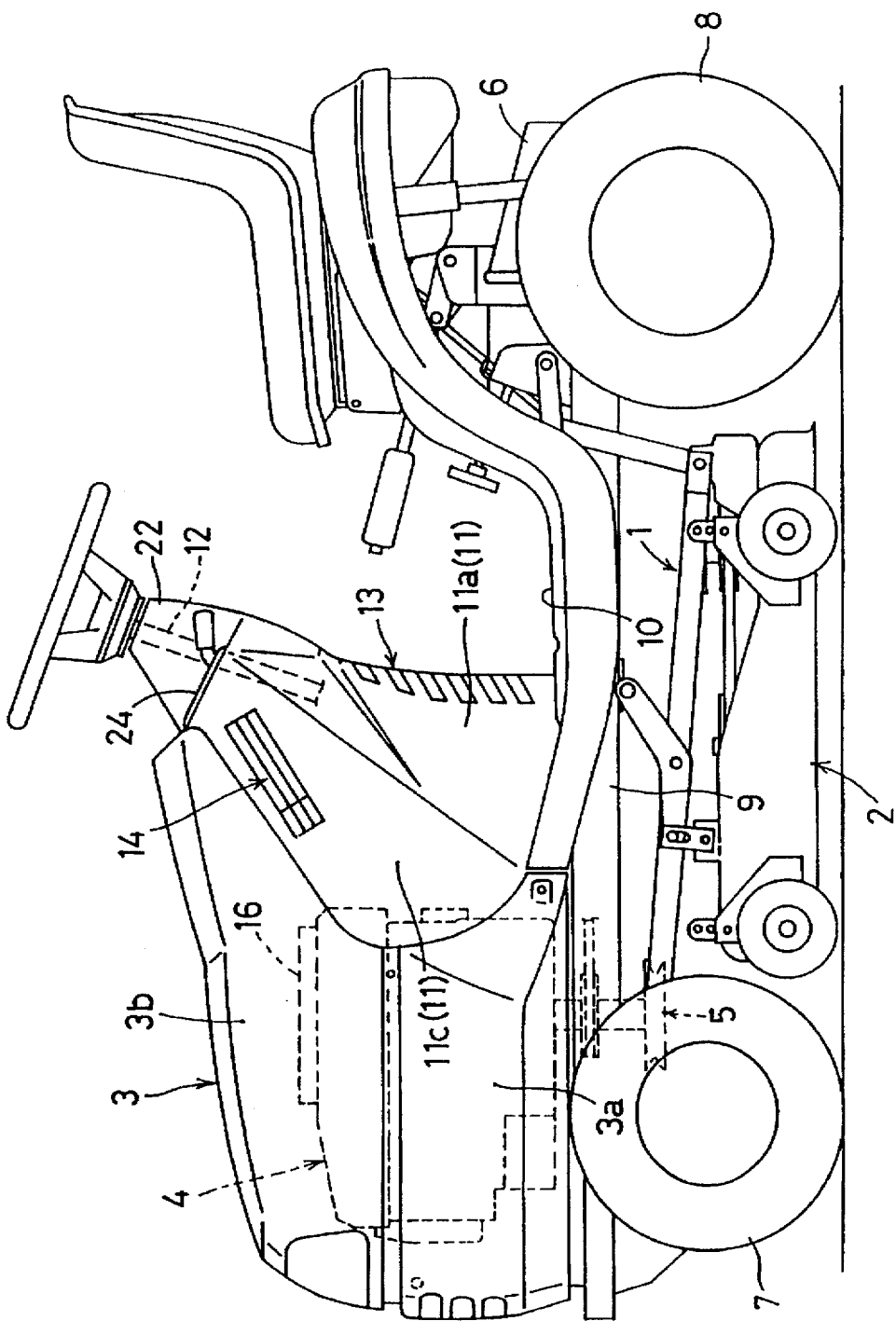
FIG. 1 is a side elevation of a lawn mower.

FIG. 1 shows a riding lawn mower which is one example of working vehicles. This lawn mower has a link mechanism 1 vertically movably connecting an underslung grass cutting unit 2 to a vehicle body between front and rear wheels 7 and 8. An engine hood 3 forms an engine room for accommodating an engine 4 mounted on a front portion of the vehicle body. Power of the engine 4 is supplied to the grass cutting unit 2 through a belt transmission mechanism 5, and to the rear wheels 8 through a transmission 6. The hood 3 has a two-part construction including a lower hood 3a fixed to a body frame 9 by bolts or the like, and an upper hood 3b pivotable about a transverse front axis between an open position and a closed position.

A steering console 11 is provided to cover an opening formed rearwardly of the engine hood 3, so that the engine room is a substantially closed space. As seen from FIGS. 2 through 5, the steering console 11 is a channel-shaped body having an arcuate section, including a right side wall 11b, a left side wall 11c, and a front wall 11a extending between one vertical edge of the right side wall 11b and one vertical edge of the left side wall 11c. Further, an upper wall 24 is provided to be continuous with upper edges of the right side wall 11b, left side wall 11c and front wall 11a. The upper wall 24 defines a control panel. Thus, the right side wall 11b, left side wall 11c, front wall 11a and upper wall 24 are all formed continuous, i.e. integral with one another, to define a rear engine room. A steering stem 12 extends through the steering console 11 to be interlocked to a gear type steering control mechanism (not shown). A driver's foot rest 10 is disposed rearwardly of the front wall 11a.

The engine 4 is air-cooled, and has an output shaft extending vertically. The engine 4 draws cooling air from above. The right side wall 11b, left side wall 11c and front wall 11a of the steering console 11 define air intake openings for cooling the engine 4.

Figure 2:
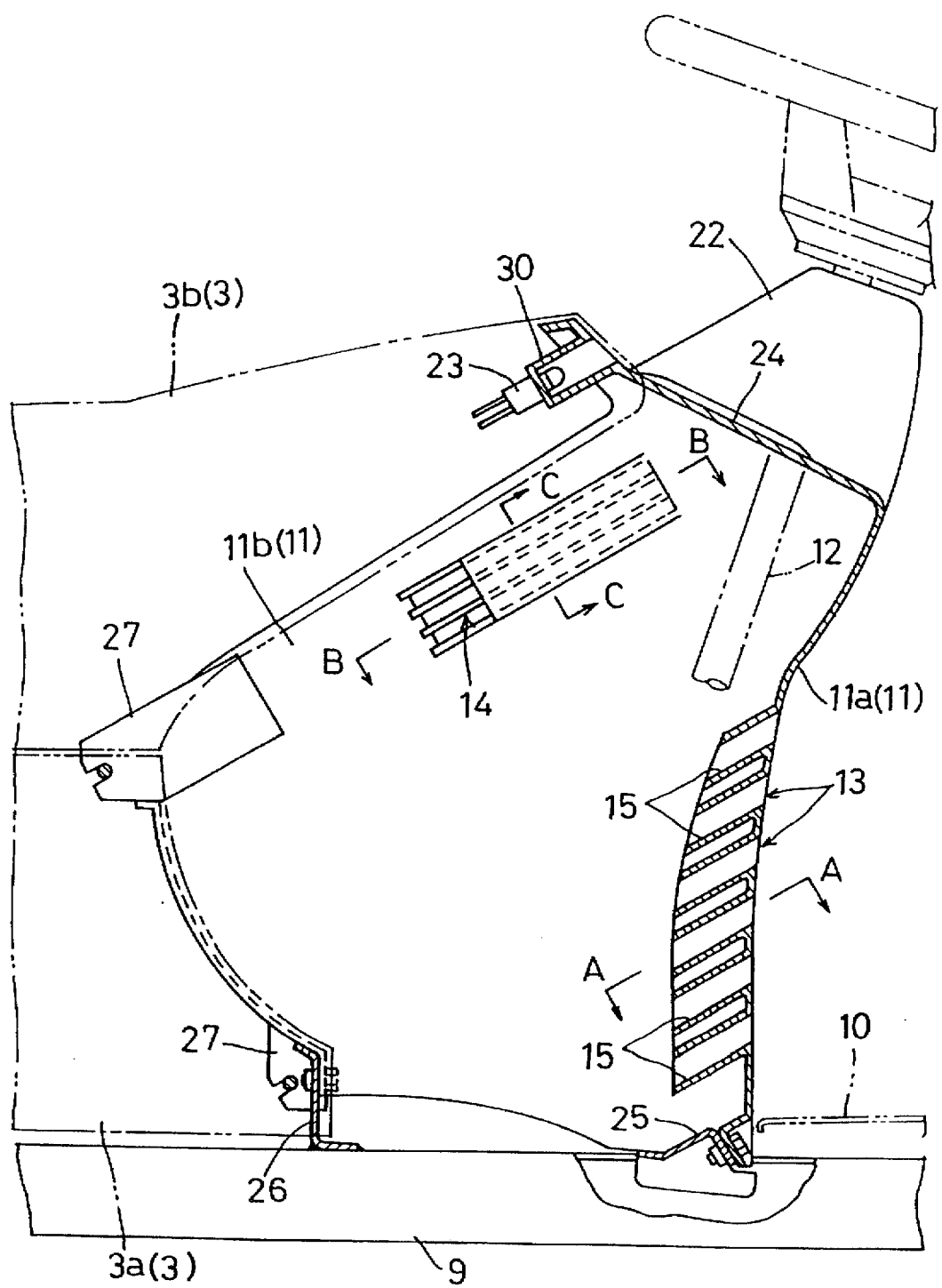
FIG. 2 is a sectional side view of a region of a steering console formed of plastics.
Figure 3:
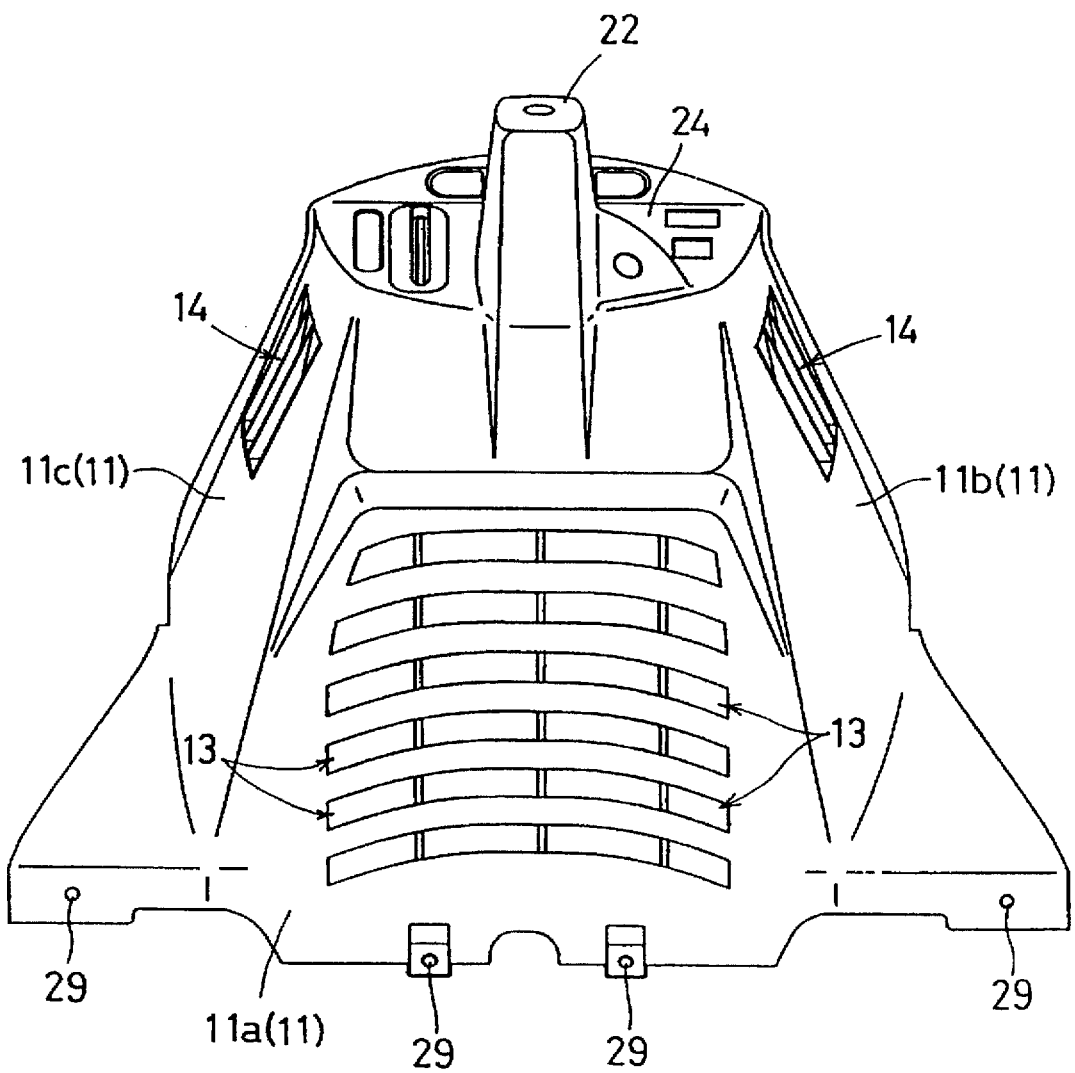
FIG. 3 is a rear view of the steering console.
Figure 6:
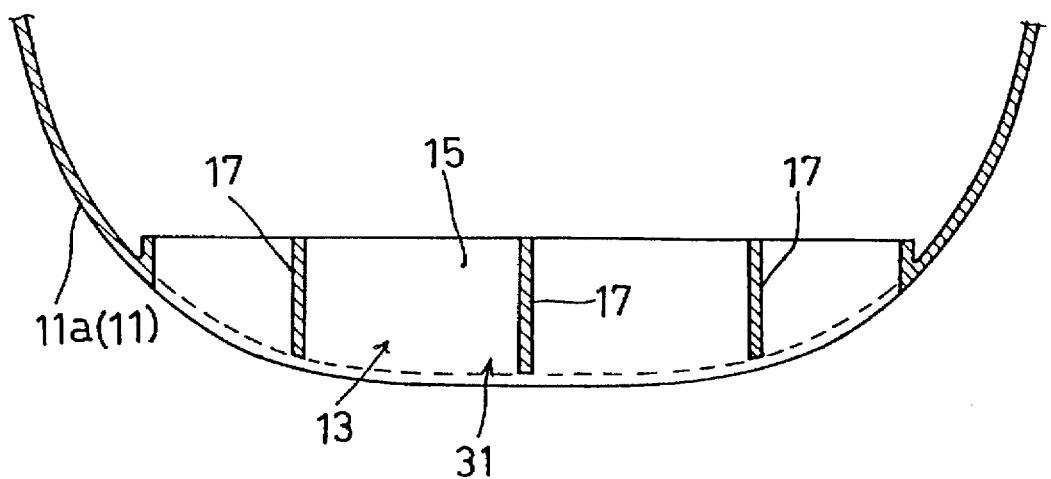
FIG. 6 is a section taken on line A—A of FIG. 2.

Specifically, as shown in FIG. 2, the right and left side walls 11b and 11c of the steering console 11 define lateral air intake devices 14 extending obliquely in a forward and downward direction, and the front wall 11a of the steering console 11 defines a similar air intake device 13. As shown in FIGS. 3 and 6, the air intake device 13 includes elongate openings 31 extending substantially over an entire transverse range of the front wall 11a. Each of these openings 31 has a large width to allow passage of relatively large particles of dust such as grass clippings. Each opening 31 has guide plates 15 extending along upper and lower edges thereof and inclined inwardly or forwardly and downwardly to guide incoming air in an obliquely downward direction. Thus, engine cooling air is drawn in to flow forwardly and downwardly through the air intake device 13 and then toward an upper region of the engine 4. Consequently, relatively large particles of dust such as grass clippings fall by gravity in the course of forward and downward flow. Such large particles have little possibility of reaching a dust screen 16 adjacent an intake section of the engine 4. As illustrated, reinforcing ribs 17 are arranged in suitable positions between adjacent plates 15.

Figure 5:
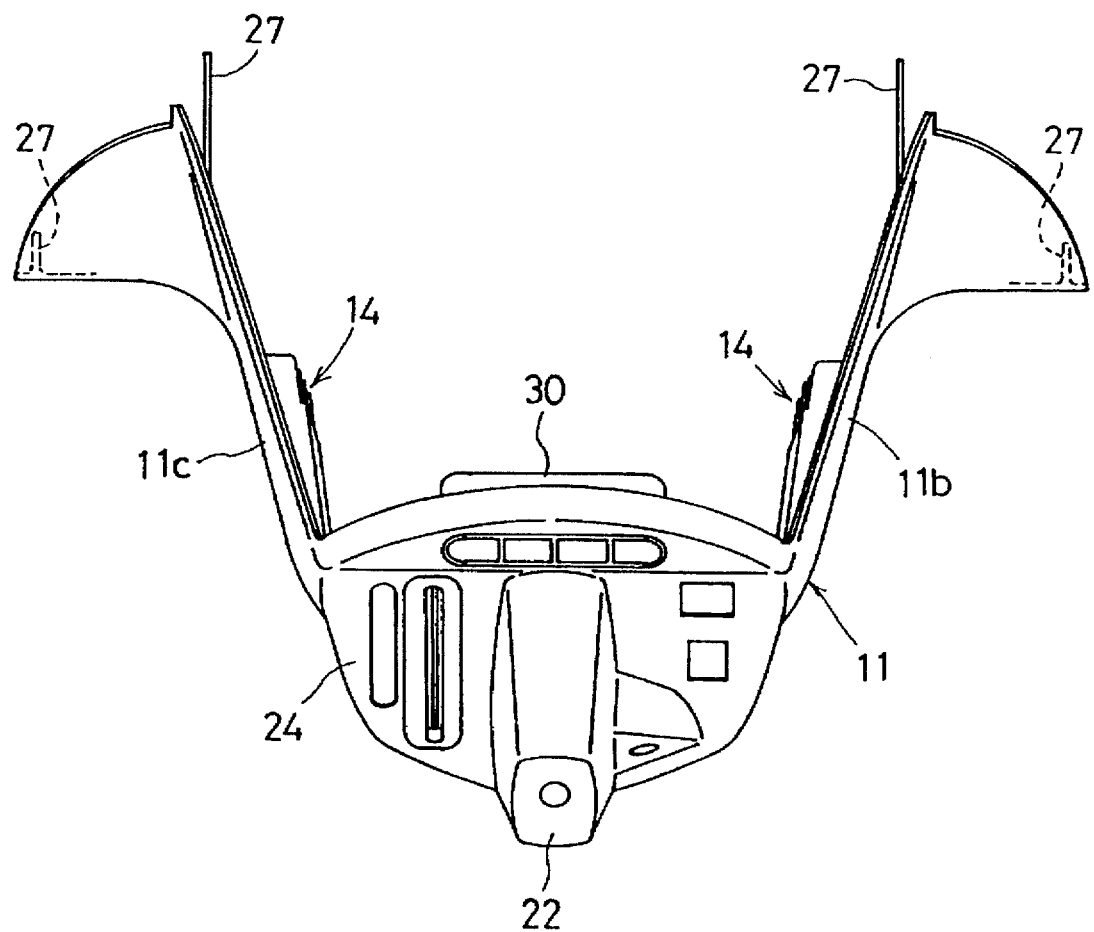
FIG. 5 is a plan view of the steering console.
Figure 7:
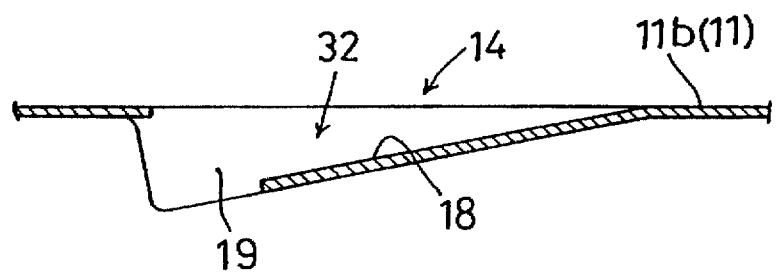
FIG. 7 is a section taken on line B—B of FIG. 2.
Figure 8:
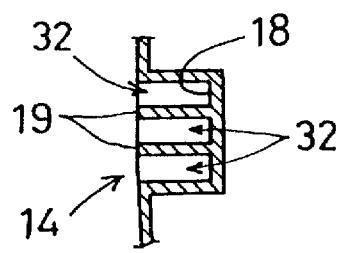
FIG. 8 is a section taken on line C—C of FIG. 2.

The right and left side walls 11b and 11c have a gull wing shape spreading laterally outward as they extend downward (see FIG. 5). As shown in FIGS. 3, 7 and 8, the lateral air intake devices 14 formed on the right and left side walls 11b and 11c have a plurality of slits 32 arranged vertically and extending in the same forward and downward direction as the air intake device 13 of the front wall 11a. The slits 32 are defined by inner walls 18 bent inward, and these inner walls 18 act also as air flow guides. The slits 32 are divided by partition plates 19. Consequently, ambient air drawn in is guided to flow forwardly and downwardly.

Air flows after cooling the engine 4 are exhausted forwardly from the front of the vehicle body.

Figure 4:
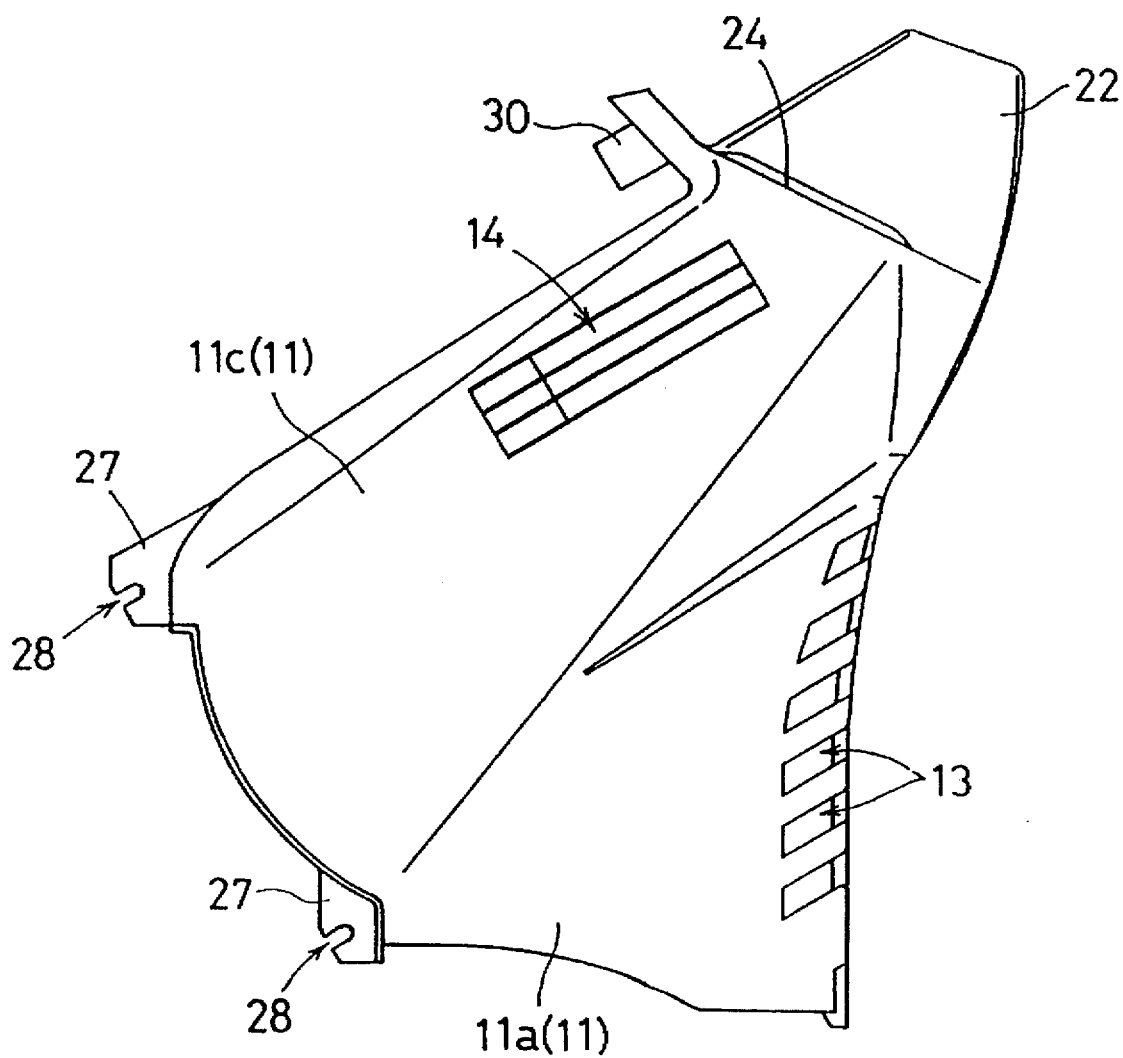
FIG. 4 is a side view of the steering console.

As shown in FIGS. 3 through 5, the steering stem 12 is rotatably supported by a steering column 22 formed of plastics to be integral with the upper wall 24 of the steering console 11. The upper wall 24 is used as a control panel including varied control devices and indicator lamps 23 for indicating varied control conditions. Thus, the right side wall 11b, left side wall 11c, front wall 11a, upper wall 24 and steering column 22 are formed integral with one another to constitute the steering console 11. This integral body is belted to rear and front support members 25 and 26 connected in right and left positions to the body frame 9, and is also fixed to the lower hood 3a in two, right and left, positions. The steering console 11 includes plates 27 for connection to the lower hood 3a and defining bolt receiving cutouts 28. The plates 27, cutouts 28, and bolt receiving bores 29 formed in rear positions of the steering console 11 for connection to the body frame 9, extend in substantially the same forward and downward direction as the air intake devices 13 and 14.

The control panel 24 includes a flange 30 for supporting the indicator lamps 23. This flange 30 also extends in substantially the same forward and downward direction as the air intake devices 13 and 14.

Not only the steering console 11 but the steering column 22 and control panel 24 are shaped to diverge forwardly and downwardly along the directions in which the air intake devices 13 and 14 extend. When this integral body is formed by injection molding, the dies may be parted along a forming direction to be removable in one direction. This realizes a reduction in manufacturing cost.

What is claimed is:

1. A steering console connected to an engine hood to form an engine accommodating space with said engine hood, said steering console positioned rearwardly of said engine hood and said steering console comprising:

a right side wall and a left side wall;

a first wall interconnecting one vertical edge of said right side wall and one vertical edge of said left side wall, wherein said first wall defines an air intake means including air intake openings, and flow guide plates extending obliquely downward from said openings towards said engine accommodating space;

an upper wall interconnecting upper edges of said right side wall, said left side wall and said first wall, said upper wall acting as a control panel; and a steering column projecting upward from said upper wall for supporting a steering stem;

wherein said steering console is formed of plastics to be an integral whole.

2. A steering console as defined in claim 1, wherein each said right side wall and said left side wall defines lateral air intake means including intake slits, and partition plates extending substantially downwardly from said intake slits towards said engine accommodating space.

3. A steering console as defined in claim 1, wherein said upper wall includes an indicator support flange extending substantially downwardly from said upper wall towards said engine accommodating space.

4. A steering console as defined in claim 2, wherein said upper wall includes an indicator support flange extending substantially downwardly from said upper wall towards said engine accommodating space.

5. A steering console connected to an engine hood to form an engine accommodating space with said engine hood, said steering console comprising:

a right side wall having at least a first and second vertical edge and a left side wall having at least a first and second vertical edge, wherein said right side wall and said left side wall include coupling means formed on said first vertical edges thereof for connecting said right side wall and said left side wall to said engine hood, said coupling means having mounting cutouts extending substantially downwardly from said first vertical edges towards said engine accommodating space;

a first wall interconnecting said second vertical edge of said right side wall and said second vertical edge of said left side wall, wherein said first wall defines air intake means including air intake openings and flow guide plates extending obliquely downward from said openings;

an upper wall interconnecting upper edges of said right side wall, said left side wall and said first wall, said upper wall acting as a control panel; and a steering column projecting upward from said upper wall for supporting a steering stem;

wherein said steering console is formed of plastics to be an integral whole.

* * * * *